(12) United States Patent
Coulson et al.

(10) Patent No.: US 10,273,003 B2
(45) Date of Patent: Apr. 30, 2019

(54) MULTI-TANK SYSTEM FOR AERIAL FIREFIGHTING AIRCRAFT

(71) Applicants: Britton Coulson, Port Alberni (CA); Wayne Coulson, Port Alberni (CA)

(72) Inventors: Britton Coulson, Port Alberni (CA); Wayne Coulson, Port Alberni (CA)

( * ) Notice: Subject to any disclaimer, the term of this patent is extended or adjusted under 35 U.S.C. 154(b) by 0 days.

(21) Appl. No.: 15/487,945

(22) Filed: Apr. 14, 2017

(65) Prior Publication Data
US 2018/0297705 A1    Oct. 18, 2018

(51) Int. Cl.
*B64D 1/16* (2006.01)
*A62C 3/02* (2006.01)
*B64C 1/06* (2006.01)

(52) U.S. Cl.
CPC .............. *B64D 1/16* (2013.01); *A62C 3/0235* (2013.01); *A62C 3/0242* (2013.01); *B64C 1/061* (2013.01)

(58) Field of Classification Search
CPC ............. B64D 1/00–1/22; B64D 25/12; A62C 3/0235; A62C 3/0242; B64C 1/061
See application file for complete search history.

(56) References Cited

U.S. PATENT DOCUMENTS

| | | | | |
|---|---|---|---|---|
| 1,761,889 A | * | 6/1930 | Junkers | B64D 1/16 244/136 |
| 1,997,669 A | * | 4/1935 | Arcieri | A62C 3/0242 244/136 |
| 2,500,015 A | * | 3/1950 | Tweney | B64C 3/00 244/119 |
| 3,698,480 A | | 10/1972 | Newton | |
| 3,901,467 A | * | 8/1975 | Hawkshaw | B64D 1/16 169/53 |
| 4,172,499 A | | 10/1979 | Richardson et al. | |
| | | (Continued) | | |

FOREIGN PATENT DOCUMENTS

WO    WO-2016026739 A1  *  2/2016  .............. B64B 1/70

OTHER PUBLICATIONS

Julian Cordle, Aerial Firefighting Part Two: The Different Planes Converted, and One Big Red Button, Apr. 3, 2015, AirlineReporter. com, http://www.airlinereporter.com/2015/04/aerial-firefighting-part-two-different-planes-used-one-big-red-button/, accessed Sep. 11, 2017.*

(Continued)

*Primary Examiner* — Brian M O'Hara
*Assistant Examiner* — Alexander V. Giczy
(74) *Attorney, Agent, or Firm* — Sterne, Kessler, Goldstein & Fox P.L.L.C.

(57) ABSTRACT

A multi-tank system and aircraft for dispersing firefighting materials includes a fuselage, a pair of wings, a first storage tank, a second storage tank, a first opening, a second opening, a first closure, a second closure, and an actuator. The first opening is disposed forward of a center of gravity of the aircraft and the second opening is disposed rearward of the center of gravity of the aircraft to maintain stability of the aircraft. The first opening is coupled to the first storage tank and the second opening is coupled to the second storage tank; a fuselage keel beam is positioned around the perimeters of the first and second openings. The actuator is configured to open the first closure and the second closure, in order to disperse firefighting materials such as water, fire retardant, or a mixture thereof.

23 Claims, 7 Drawing Sheets

(56) References Cited

U.S. PATENT DOCUMENTS

| | | | |
|---|---|---|---|
| 4,936,389 A | 6/1990 | MacDonald et al. | |
| 5,279,481 A * | 1/1994 | Trotter | B64D 1/16 169/53 |
| 5,326,053 A * | 7/1994 | Pahl | B64D 1/16 169/53 |
| 5,451,016 A | 9/1995 | Foy et al. | |
| 5,692,703 A * | 12/1997 | Murphy | B64C 25/04 244/102 R |
| 7,284,727 B2 * | 10/2007 | Nolan | B64D 1/16 244/136 |
| 2005/0017131 A1 * | 1/2005 | Hale | A62C 3/0228 244/136 |
| 2006/0207774 A1 * | 9/2006 | Payassis | A62C 25/00 169/53 |
| 2008/0210825 A1 * | 9/2008 | Hale | B64D 1/16 244/136 |
| 2010/0282914 A1 | 11/2010 | Hale et al. | |
| 2010/0320320 A1 * | 12/2010 | Kismarton | B29C 43/24 244/119 |
| 2011/0017870 A1 * | 1/2011 | Gallant | B64C 1/061 244/129.3 |
| 2011/0168414 A1 | 7/2011 | Nelson | |
| 2013/0119198 A1 * | 5/2013 | Campbell | B64C 1/00 244/118.5 |
| 2013/0199804 A1 * | 8/2013 | Parker | A62C 3/0242 169/46 |
| 2014/0158828 A1 * | 6/2014 | Loyant | B64C 1/26 244/131 |
| 2014/0240147 A1 * | 8/2014 | Goda | B64D 1/16 340/945 |
| 2015/0291269 A1 * | 10/2015 | Goelet | B64D 1/02 244/30 |
| 2017/0267326 A1 * | 9/2017 | Kuhlmann | B64D 1/18 |
| 2017/0268838 A1 * | 9/2017 | Army | B64D 13/06 |

OTHER PUBLICATIONS

Wikipedia, British Aerospace 146, https://en.wikipedia.org/wiki/British_Aerospace_146; archived by Internet Archive on Jan. 3, 2017, https://web.archive.org/web/20170103191014/https://en.wikipedia.org/wiki/British_Aerospace_146; accessed Sep. 6, 2017.*

USDA Forest Service, "Large Airtanker Modernizaton Strategy", Final Version Feb. 10, 2012; accessible from https://www.fs.fed.us/fire/aviation/airtanker_modernization_strategy.pdf; accessed Apr. 12, 2018 (Year: 2012).*

US Army, FM 55-9 Unit Air Movement Planning, Oct. 14, 1994, Chapter 2, Air Mobility Command Aircraft; accessible from https://www.globalsecurity.org/military/library/policy/army/fm/55-9/index.html; accessed Apr. 12, 2018 (Year: 1994).*

Andrew P. Collins, "This Boeing 747 Is the World's Biggest Firefighting Beast", Aug. 8, 2016; accessible from https://foxtrotalpha.jalopnik.com/this-boeing-747-is-the-worlds-biggest-firefighting-beas-1785002459; accessed Apr. 12, 2018 (Year: 2016).*

"Fire Retardant Delivery System | RADS-XXL Firefighting Tank," retrieved on Aug. 1, 2017 from http://www.coulsonaviationusa.com, 4 pages.

"2014 Gallery—Neptune Aviation," retrieved on Aug. 1, 2017 from https://neptuneaviation.com/2014-gallery/, 1 page.

"2015 Gallery—Neptune Aviation," retrieved on Aug. 1, 2017 from https://neptuneaviation.com/2015-gallery/, 1 page.

"2016 Gallery—Neptune Aviation," retrieved on Aug. 1, 2017 from https://neptuneaviation.com/2016-gallery/, 1 page.

International Search Report and Written Opinion of the International Searching Authority for International Appl. No. PCT/IB2018/052636, Canadian Intellectual Property Office, Gatineau, Quebec, Canada, dated Jul. 11, 2018, 8 pages.

* cited by examiner

MULTI-TANK SYSTEM FOR AERIAL FIREFIGHTING AIRCRAFT

BACKGROUND

Field

The present disclosure relates to aerial firefighting suppression systems and apparatuses. More specifically, embodiments of the present disclosure relate to large capacity and high flow rate multi-tank systems and apparatuses for aerial firefighting.

Background

Aerial firefighting suppression systems for dispersing materials, for example, water, fire retardant, or a mixture thereof, are needed during large or numerous fire outbreaks, for example, forest fires. Large capacity, high flow rate systems that maintain appropriate pilot control and flight safety are needed for aerial firefighting aircraft. Building or modifying aircraft to meet these needs is challenging because large capacity tanks, large enough to meet minimum flow rate standards, can cause instability to aircraft from dynamic changes of the center of gravity (CG), for example, upon dispersing the material.

BRIEF SUMMARY

In some embodiments, an aircraft for dispersing material includes a fuselage defining an interior cabin of the aircraft, a pair of wings coupled to the fuselage, a first storage tank disposed in the interior cabin forward of a center of gravity of the aircraft, a second storage tank disposed in the interior cabin rearward of the center of gravity of the aircraft, a first opening in an underside of the fuselage, a second opening in the underside of the fuselage, a first closure for the first opening, a second closure for the second opening, and an actuator configured to open at least one of the first closure and the second closure.

In some embodiments, the first storage tank is configured to store a first material. In some embodiments, the second storage tank is configured to store a second material. In some embodiments, the first opening is coupled to the first storage tank. In some embodiments, the second opening is coupled to the second storage tank.

In some embodiments, a first wing is disposed on a first side of the fuselage and a second wing is disposed on a second side of the fuselage. In some embodiments, the first storage tank is disposed forward of the pair of wings and the second storage tank is disposed rearward of the pair of wings. In some embodiments, the first opening is disposed forward of the center of gravity of the aircraft and the second opening is disposed rearward of the center of gravity of the aircraft. In some embodiments, the first storage tank is disposed above the first opening and the second storage tank is disposed above the second opening.

In some embodiments, the actuator is configured to open the first closure and the second closure. In some embodiments, the actuator is configured to open the first closure and the second closure synchronously. In some embodiments, the actuator is configured to open the first closure and the second closure at the same time. In some embodiments, the actuator is configured to open the first closure and the second closure at the same rate. In some embodiments, the actuator is configured to close the first closure and the second closure at the same rate. In some embodiments, the actuator is configured to open the first closure and the second closure at different rates. In some embodiments, the actuator is configured to close the first closure and the second closure at different rates.

In some embodiments, the actuator is mechanical. In some embodiments, the actuator is electrical. In some embodiments, the actuator is hydraulic. In some embodiments, the actuator is pneumatic. In some embodiments, the actuator is mechanical and mechanically coupled to the first closure and the second closure. In some embodiments, the actuator is electrical and mechanically coupled to the first closure and the second closure. In some embodiments, the first closure includes a first door disposed at a lower end of the first storage tank and the second closure includes a second door disposed at a lower end of the second storage tank. In some embodiments, the first closure includes a first door disposed at the underside of the fuselage and the second closure includes a second door disposed at underside of the fuselage. In some embodiments, the first door is coupled to the lower end of the first storage tank and disposed in the first opening. In some embodiments, the second door is coupled to the lower end of the second storage tank and disposed in the second opening.

In some embodiments, the first storage tank and the second storage tank have a total volume of 3,000 to 10,000 US gallons. In some embodiments, the first storage tank and the second storage tank have a total volume of 4,000 to 7,500 US gallons. In some embodiments, the first storage tank and the second storage tank have a total volume of 4,200 to 5,000 US gallons. In some embodiments, the first storage tank and the second storage tank have the same volume.

In some embodiments, the first material and the second material are the same. In some embodiments, the first material and the second material are different. In some embodiments, the first material is water and the second material is a fire retardant.

In some embodiments, the aircraft includes a fuselage keel beam. In some embodiments, the first opening and the second opening intersect the fuselage keel beam. In some embodiments, a midpoint of the first opening and a midpoint of the second opening are separated by a distance of 10 to 40 feet. In some embodiments, the first opening and the second opening are disposed along a longitudinal axis of the aircraft.

In some embodiments, the first closure has a first edge and a second edge which meet at a centerline of the first closure when closed. In some embodiments, a width of the first closure is 18 to 30 inches. In some embodiments, the width of the first closure is about 22 inches. In some embodiments, the second closure has a first edge and a second edge which meet at a centerline of the second closure when closed. In some embodiments, a width of the second closure is 18 to 30 inches. In some embodiments, the width of the second closure is about 22 inches. In some embodiments, the first closure is a clamshell door. In some embodiments, the first closure and the second closure are both clamshell doors.

In some embodiments, the aircraft is an airplane. In some embodiments, the pair of wings is disposed below a midline of the fuselage.

In some embodiments, a system for dispersing material from an aircraft includes a first storage tank for disposing forward of a center of gravity of an aircraft, a second storage tank for disposing rearward of the center of gravity of an aircraft, a first opening disposed at a lower end of the first storage tank, a second opening disposed at a lower end of the second storage tank, a first closure disposed at the lower end of the first storage tank for the first opening, a second closure disposed at the lower end of the second storage tank for the second opening, and an actuator configured to open the first closure of the first opening and the second closure of the second opening. In some embodiments, the system can include a controller configured to activate the actuator.

In some embodiments, the actuator is configured to open the first closure and the second closure synchronously. In some embodiments, a midpoint of the first closure and a midpoint of the second closure are separated by a distance of 10 to 40 feet. In some embodiments, the first closure and the second closure are disposed along a longitudinal axis of the aircraft.

In some embodiments, the first storage tank and the second storage tank have a total volume of 3,000 to 10,000 US gallons. In some embodiments, the first storage tank and the second storage tank have a total volume of 4,000 to 7,500 US gallons. In some embodiments, the first storage tank and the second storage tank have a total volume of 4,200 to 5,000 US gallons. In some embodiments, the first storage tank and the second storage tank have the same volume.

In some embodiments, the first closure includes a first door and the second closure includes a second door. In some embodiments, the first door has a first edge and a second edge which meet at a centerline of the first door when closed. In some embodiments, a width of the first door is 18 to 30 inches. In some embodiments, the width of the first door is about 22 inches. In some embodiments, the actuator is mechanically coupled to the first door and the second door. In some embodiments, the actuator is electrical, mechanically coupled to the first door and the second door, and activated by the controller.

In some embodiments, the storage first tank and the second storage tank are disposed equidistant from a center of gravity of the aircraft. In some embodiments, the first closure and the second closure are disposed equidistant from a center of gravity of the aircraft. In some embodiments, the first storage tank and the second storage tank are disposed symmetrically about a center of gravity of the aircraft. In some embodiments, the first closure and the second closure are disposed symmetrically about a center of gravity of the aircraft. In some embodiments, the first storage tank and the second storage tank are disposed along a longitudinal axis of the aircraft. In some embodiments, the first closure and the second closure are disposed along a longitudinal axis of the aircraft.

In some embodiments, a method of dispersing material from an aircraft can include disposing a first material in a first storage tank and a second material in a second storage tank, disposing the first storage tank and the second storage tank in an interior cabin of the aircraft, and opening a first closure and a second closure.

In some embodiments, the first storage tank is disposed forward of a center of gravity of the aircraft and the second storage tank is disposed rearward of the center of gravity of the aircraft. In some embodiments, the first closure is disposed at a lower end of the first storage tank and the second closure is disposed at a lower end of the second storage tank.

In some embodiments, opening the first closure and the second closure disperses the first material and the second material from the aircraft. In some embodiments, the first closure and the second closure are opened synchronously to disperse the first material and the second material from the aircraft. In some embodiments, the first closure and the second closure are closed synchronously. In some embodiments, the first closure and the second closure are configured to open and close at the same rate. In some embodiments, the first material and the second material are water, fire retardant, or a mixture or combination thereof.

In some embodiments, the method includes modifying a fuselage keel beam such that the first closure and the second closure intersect the fuselage keel beam. In some embodiments, disposing the first storage tank and the second storage tank in the interior cabin of the aircraft includes disposing the first storage tank and the second storage tank such that a midpoint of the first closure and a midpoint of the second closure are separated by a distance of 10 to 40 feet. In some embodiments, the first closure and the second closure are disposed along a longitudinal axis of the aircraft.

BRIEF DESCRIPTION OF THE DRAWINGS

The accompanying drawings, which are incorporated herein and form a part of the specification, illustrate the embodiments and, together with the description, further serve to explain the principles and to enable a person skilled in the relevant art(s) to make and use the embodiments. Objects and advantages of illustrative, non-limiting embodiments will become more apparent by describing them in detail with reference to the attached drawings.

FIG. 1 illustrates a perspective view of an aircraft for dispersing material, according to an embodiment.

FIG. 2 illustrates a perspective view of a storage tank, according to an embodiment.

FIG. 3 illustrates a side view of an aircraft for dispersing material, according to an embodiment.

FIG. 4 illustrates an underside view of an aircraft for dispersing material, according to an embodiment.

FIG. 5 illustrates a schematic of an aircraft for dispersing material, according to an embodiment.

FIG. 6 illustrates a schematic of an aircraft for dispersing material, according to an embodiment.

FIG. 7 illustrates a cross-sectional view of a storage tank with a closure in a closed position, according to an embodiment.

FIG. 8 illustrates a cross-sectional view of a storage tank with a closure in an open position, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Firefighting aircraft for dispersing materials, for example, water, fire retardant, or a mixture thereof, are needed during large or numerous fire outbreaks such as forest fires. Maintaining acceptable flow rates and pilot control of the aircraft are important for good drop patterns and flight safety. Furthermore, utilizing an economical but sufficient amount of dispersing materials, for example, more than 3,000 US gallons, and maintaining acceptable flow rates, for example, by gravity discharge via ventral openings having closures, is also important for efficiency of aircraft support as well as ground drop coverage.

Aerial firefighting systems utilize modular aerial spraying systems as well as modified fixed and rotary wing aircraft. Modifications to the airframe or fuselage can be made to accommodate the added weight and space of the dispersing materials. The combined water and fire retardant delivery capacity as well as the ground drop coverage provide a rating system for a particular aircraft, which is certified by the Interagency Air Tanker Board (IAB). The IAB also sets minimum flow rate standards for aircraft classified as air tankers, such as aerial firefighting aircraft, and restrict aircraft which do not meet the standards.

Among the methodologies developed for aerial firefighting suppression systems, the constant flow delivery system, which uses closures, such as doors, that open gradually to permit progressive release of the dispersing materials, counteracts the reduction in water column height, while maintaining an even dispersal pattern on the ground. However, large capacity storage tanks, for example, capable of dispersing more than 3,000 US gallons, can cause instability to the aircraft due to dynamic changes of the center of gravity of the aircraft prior to and during a release.

Accordingly, there is a need for improved aerial firefighting suppression systems and apparatuses capable of large capacity and high flow rate delivery of dispersing materials while maintaining aircraft stability and safety.

Embodiments of the aerial firefighting suppression systems and apparatuses described herein have a large capacity (e.g., more than 3,000 US gallons), high flow rate (e.g., greater than 1,000 US gallons per second), and stable "multi-tank" or "split tank" system. The multi-tank system uses an economical but sufficient amount of dispersing materials, for example, more than 3,000 US gallons. Additionally, the multi-tank system maintains acceptable flow rates for good drop patterns, for example, by gravity discharge via ventral openings having closures. Furthermore, the multi-tank system maintains pilot control, flight safety, and aircraft stability due to, for example, the placement of the tanks and closures about the center of gravity of the aircraft.

Figure 1:
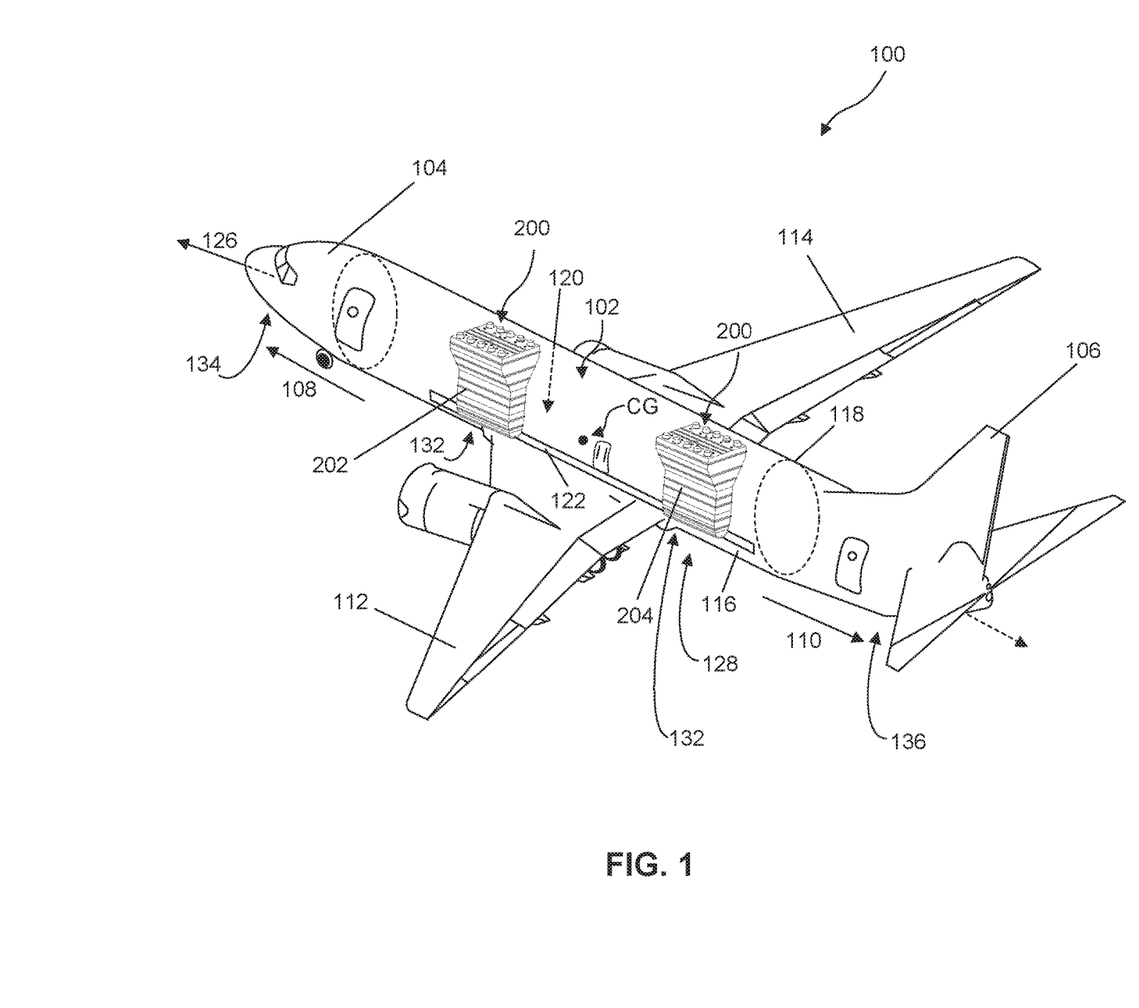

FIG. 1 illustrates aircraft 100, according to an embodiment. Aircraft 100 can include fuselage 102, cockpit 104, tail 106, first wing 112, second wing 114, interior cabin 120, landing gear 130, cockpit underside 134, tail underside 136, and a center of gravity (CG). Aircraft 100 can be orientated along longitudinal axis 126, which includes forward direction 108 and aft (or rearward) direction 110. In some embodiments, aircraft 100 is an airplane. For example, in some embodiments, aircraft 100 is a low-wing airplane having wings mounted below the main fuselage of the airplane. For example, first and second wings 112, 114 of aircraft 100 can be mounted to fuselage keel beam 122 at fuselage underside 128. For example, aircraft 100 can be a high lift capacity narrow-body commercial aircraft (e.g., 737 series, 757 series, A-318 series, A-319 series, A-320 series, etc.) or, for example, a high lift capacity wide-body cargo aircraft (e.g., C-5 series, C-17 series, C-130 series, C-141 series, etc.).

Fuselage 102 can include first side 116, second side 118, underside 128, interior cabin 120, keel beam 122, and one or more openings 132. In some embodiments, one or more openings 132 can be in fuselage underside 128. In some embodiments, fuselage underside 128 can be below a midline of fuselage 102. In some embodiments, one or more storage tanks 200 can be disposed in interior cabin 120. For example, two, three, four, or more storage tanks 200 can be disposed in interior cabin 120. As shown in FIG. 1, in some embodiments, interior cabin 120 can include first storage tank 202 and second storage tank 204. In some embodiments, first storage tank 202 can be disposed forward the pair of wings 112, 114 and second storage tank 204 can be disposed aft (rearward) the pair of wings 112, 114. In some embodiments, first storage tank 202 can be disposed forward of the center of gravity (CG) and second storage tank 204 can be disposed aft (rearward) of the center of gravity (CG). As shown, for example in FIGS. 1 and 4, in some embodiments, first storage tank 202 and/or second storage tank 204 can be disposed along longitudinal axis 126. In some embodiments, longitudinal axis 126 can run lengthwise through fuselage 102, midway between first side 116 and second side 118 of fuselage 102. In some embodiments, fuselage 102 can be symmetric about longitudinal axis 126.

Figure 2:
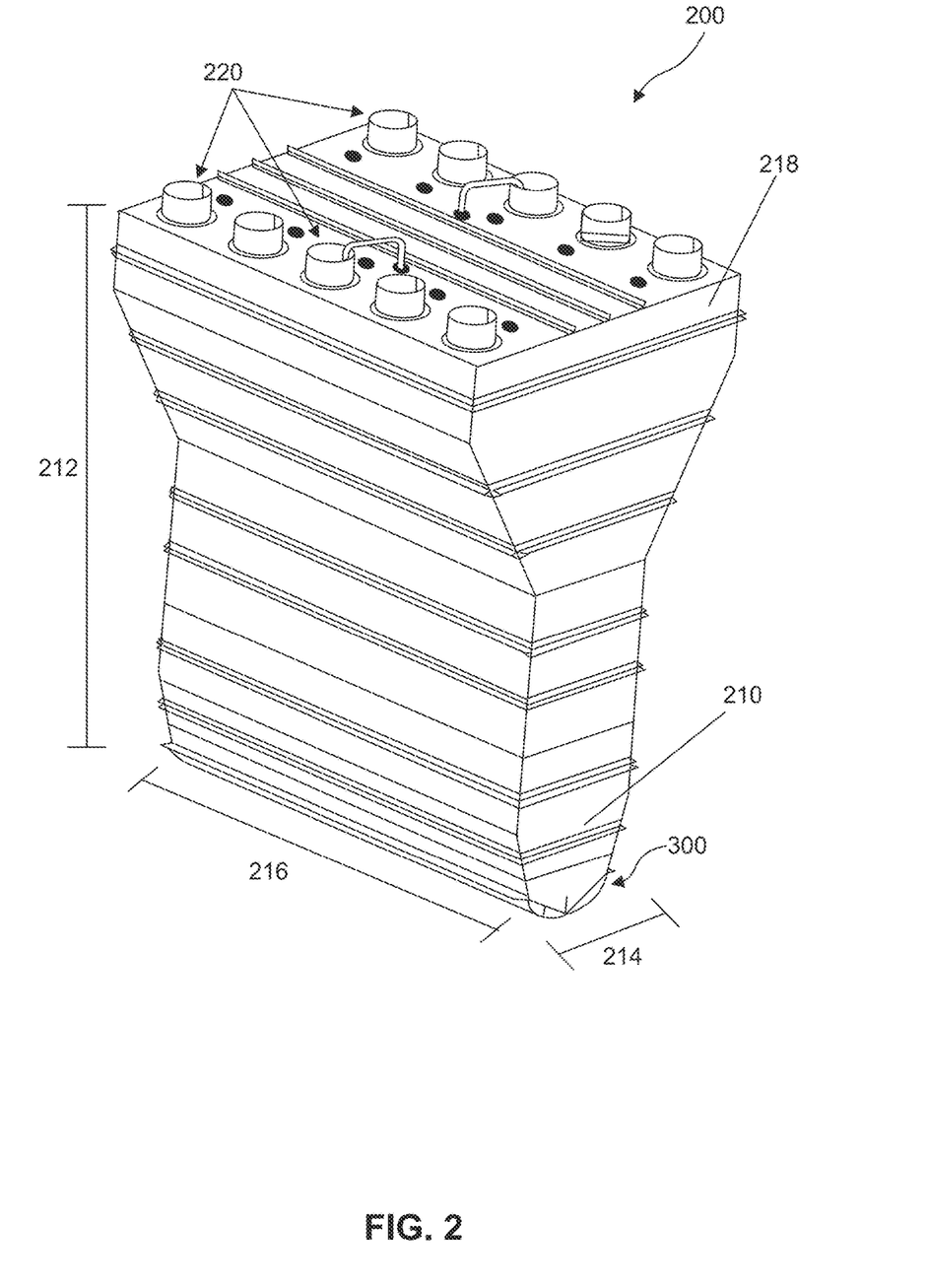

FIG. 2 illustrates storage tank 200, according to an embodiment. Storage tank 200 can include lower end 210, upper end 218, input ports 220, and closure 300, and have height 212, width 214, and length 216. In some embodiments, closure 300 can be, for example, and not by way of limitation, a door, a panel, a hatch, a valve, a control valve, or a tube with a valve. In some embodiments, closure 300 can be one or more doors, one or more panels, one or more hatches, one or more valves, one or more control valves, or one or more tubes with one or more valves. As shown in FIG. 2, in some embodiments, closure 300 can be disposed at lower end 210 of storage tank 200. For example, in some embodiments, closure 300 can close an opening disposed at lower end 210 of storage tank 200. For example, in some embodiments, closure 300 can be a door or doors disposed at lower end 210 of storage tank 200. In FIG. 2, as referred to herein, closure 300 is in a "closed" position, such that the lower end 210 of storage tank 200 prevents material from being dispersed from storage tank 200. In some embodiments, first storage tank 202 and second storage tank 204 can hold first material 206 and second material 208, respectively.

In some embodiments, storage tank 200 can have a uniform shape, for example, but not limited to a quadrilateral shape (e.g., rectangle, square, trapezoid, etc.). In some embodiments, storage tank 200 can have a tapered, beveled, angled, or curved shape. In some embodiments, storage tank 200 can have a non-uniform shape. In some embodiments, storage tank 200 can have a greater width at upper end 218 of storage tank 200 than at lower end 210 of storage tank 200.

Storage tank 200 can be various sizes. For example, in some embodiments, length 216 can be 80 to 120 inches. In some embodiments, length 216 can be 90 to 110 inches. In some embodiments, length 216 can be 100 inches. In some embodiments, width 214 can be 18 to 30 inches. In some embodiments, width 214 can be 20 to 24 inches. In some embodiments, width 214 can be 22 inches. In some embodiments, height 212 can be 100 to 500 inches. In some embodiments, height 212 can be 200 to 400 inches. In some embodiments, height 212 can be 250 to 350 inches. In some embodiments, height 212 can be 500 inches.

Storage tank 200 can be made from any suitable material, for example, but not limited to stainless steel, carbon steel, alloy steel, iron, aluminum, anodic aluminum, titanium, polyurethane, polytetrafluoroethylene (PTFE), polyvinyl chloride (PVC), metallic glass, amorphous glass, plastic fiberglass, carbon fiber, KEVLAR®, or other hybrid fiberglass material. In some embodiments, storage tank 200 can be a highly anti-corrosive stainless steel. Storage tank 200 can be a rigid structure capable of holding firefighting materials such as water, fire retardant, or a mixture thereof. In some embodiments, storage tank 200 can be a rigid structure capable of holding 1,500 to 8,000 US gallons.

As shown, for example in FIG. 2, in some embodiments, storage tank 200 can have input ports 220 for filling storage tank 200 with materials 206, 208. For example, storage tank 200 can have a volume of 1,500 to 8,000 US gallons. In some embodiments, first storage tank 202 and second storage tank 204 can have a total volume of 3,000 to 10,000 US gallons. In some embodiments, first storage tank 202 and second storage tank 204 can have a total volume of 4,000 to 7,500 US gallons. In some embodiments, first storage tank 202 and second storage tank 204 can have a total volume of 4,200 to 4,500 US gallons. In some embodiments, first storage tank 202 and second storage tank 204 can have the same volume. In some embodiments, first storage tank 202 and second storage tank 204 can have different volumes.

As shown, for example in FIG. 2, in some embodiments, closure 300 can have a total width 214 of 18 to 30 inches. In some embodiments, closure 300 can have a total width of 22 inches.

Figure 3:
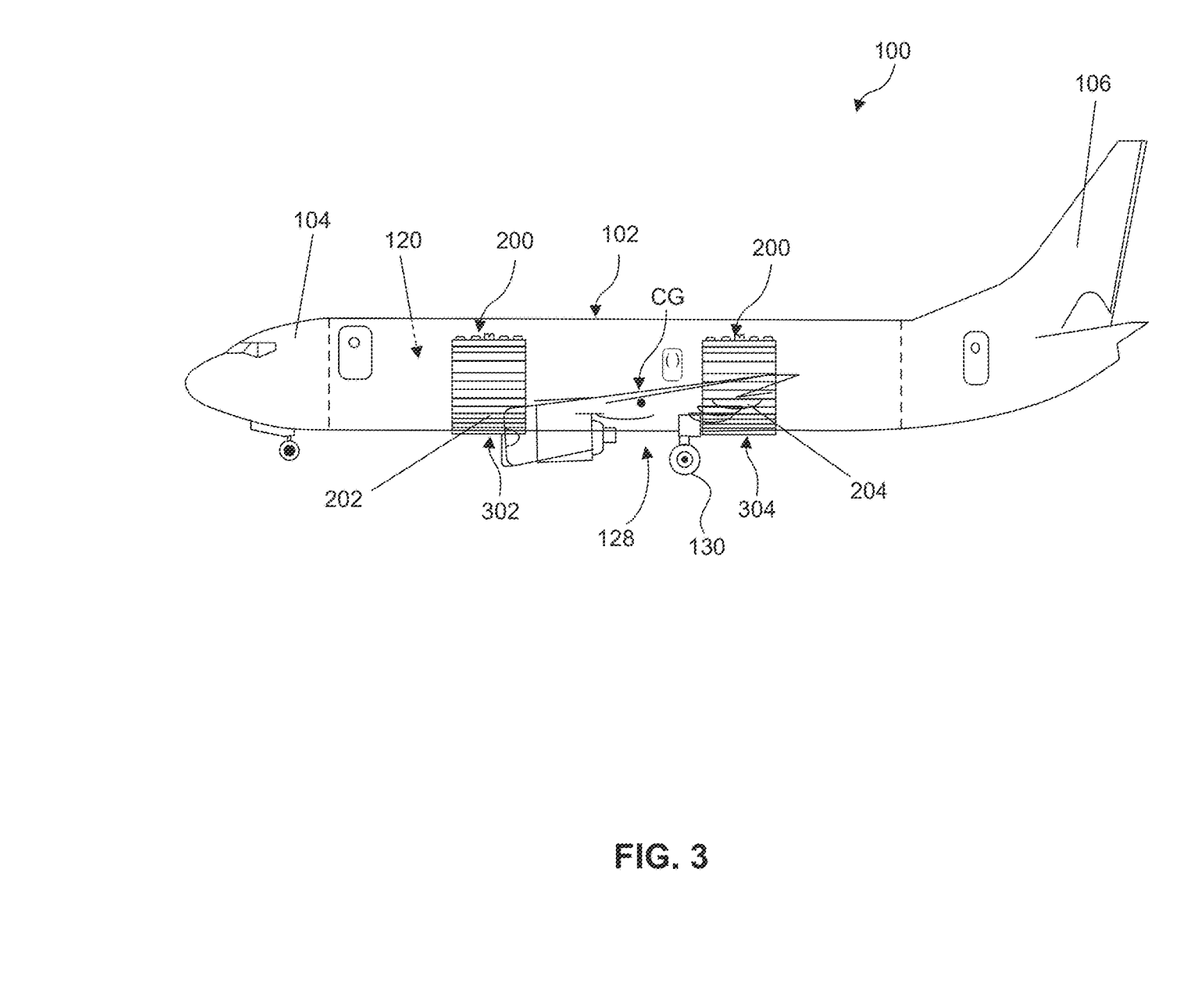
Figure 4:
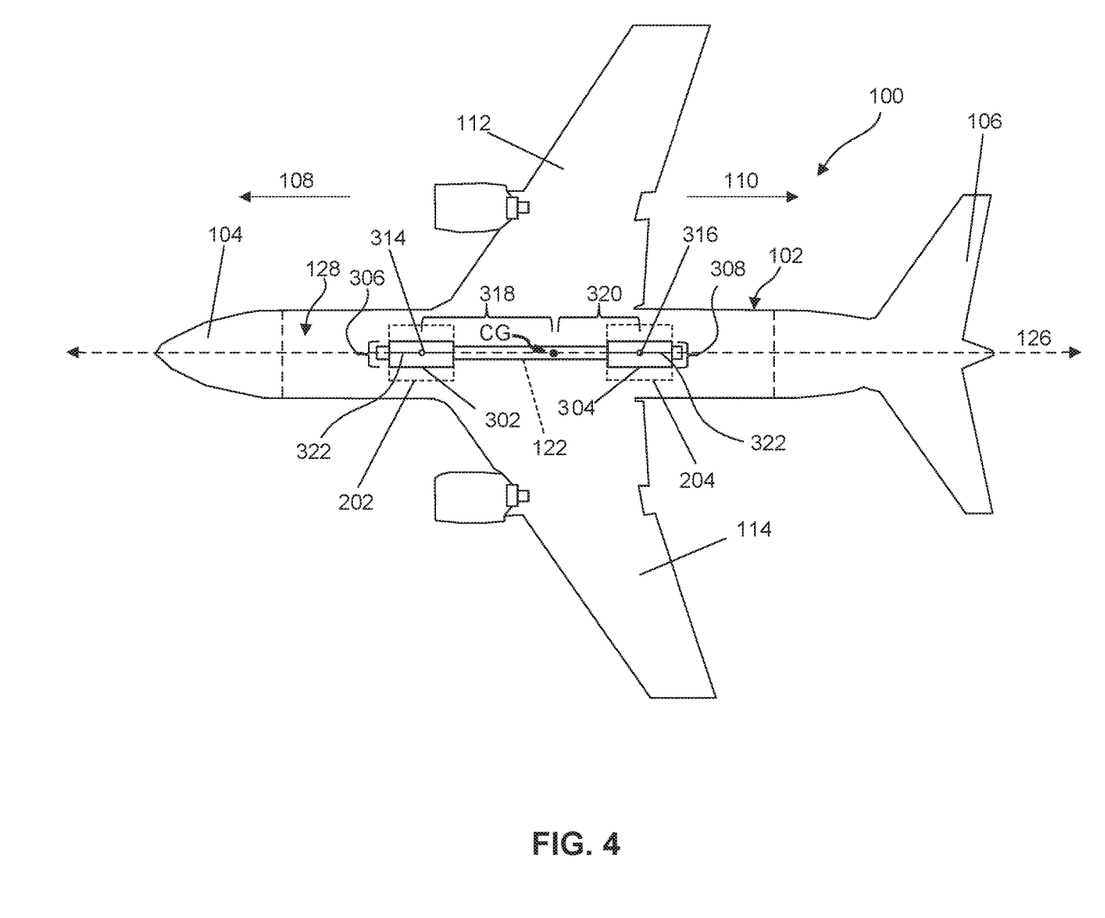

Referring to FIGS. 3 and 4, for example, embodiments of aircraft 100 and components thereof are described in detail. FIGS. 3 and 4 illustrate aircraft 100 with first storage tank 202 and second storage tank 204 disposed in interior cabin 120. First storage tank 202 and second storage tank 204 can include first closure 302 and second closure 304, respectively. In some embodiments, closures 302, 304 can be disposed at a lower end 210 of storage tanks 202, 204, respectively. In some embodiments, fuselage underside 128 can include first closure 302 and second closure 304. In some embodiments, closures 302, 304 can be disposed in fuselage underside 128 below storage tanks 202, 204, respectively, instead of or in addition to closures 302, 304 at lower end 210 of storage tanks 202, 204, respectively. In some embodiments, closures 302, 304 can be, for example, and not by way of limitation, a door, a panel, a hatch, a valve, a control valve, or a tube with a valve. In some embodiments, closure 300 can be, for example, and not by way of limitation, one or more doors, one or more panels, one or more hatches, one or more valves, one or more control valves, or one or more tubes with one or more valves.

In some embodiments, closure 300, or another closure in addition to a closure at lower end 210 of storage tank 200, can be coupled to fuselage underside 128, such that when opened, material is dispersed from storage tank 200. In some embodiments, closure 300 can include one or more valves disposed on fuselage underside 128. For example, closure 300 can include one or more tubes with butterfly valves disposed on fuselage underside 128. In some embodiments, closure 300 can include one or more valves disposed on storage tank 200. In some embodiments, closure 300 can include one or more tubes with one or more control valves (e.g., sliding stem valve, pneumatic valve, angle seat piston valve, globe valve, rotary valve, ball valve, pinch valve, diaphragm valve, solenoid valve, needle valve, gate valve, sluice valve, etc.). In some embodiments, closure 300 can be pressurized. For example, in some embodiments, closure 300 can be positioned away from first storage tank 202 and second storage tank 204 by one or more tubes, for example, disposed on cockpit underside 134 and/or tail underside 136 of aircraft 100. In some embodiments, closure 300 can include one or more panels that can spread open on fuselage underside 128. In some embodiments, closure 300 can include one or more pintles on fuselage underside 128. In some embodiments, closure 300 can include one or more panels that can spread open on storage tank 200. In some embodiments, closure 300 can include one or more pintles on storage tank 200. In some embodiments, closure 300 can include a mass flow meter that measures the outward flow of materials 206, 208 from closure 300. In some embodiments, closure 300 can include a mass flow controller that measures and regulates the outward flow of materials 206, 208 from closure 300.

In some embodiments, first storage tank 202 can be disposed forward of the center of gravity (CG) and second storage tank 204 can be disposed aft of the center of gravity (CG). In some embodiments, first closure 302 can be disposed forward of the center of gravity (CG) and second closure 304 can be disposed aft of the center of gravity (CG). Positioning first storage tank 202 and/or first closure 302 forward of the center of gravity (CG) and second storage tank 204 and/or second closure 304 aft of the center of gravity (CG) can help to evenly distribute the added firefighting materials and storage weight to the aircraft 100 and reduce dynamic changes in the center of gravity (CG) upon dispersing the firefighting materials. Reducing dynamic changes of the center of gravity (CG) improves aircraft 100 stability as well as pilot control and flight safety.

In some embodiments, first storage tank 202 can be disposed vertically above first closure 302 and second storage tank 204 can be disposed vertically above second closure 304. In some embodiments, first closure 302 and second closure 304 of storage tanks 202, 204 can be disposed in the fuselage underside 128, for example, in respective openings 132 in fuselage underside 128.

FIG. 4 illustrates an underside view of aircraft 100 (i.e., from underneath the aircraft), according to an embodiment. In some embodiments, first closure 302 and/or second closure 304 can each include a centerline 322, which intersects a midpoint 314 of first closure 302 and a midpoint 316 of second closure 304. In some embodiments, first closure 302 and second closure 304 are disposed such that the centerlines 322 are parallel with or along longitudinal axis 126.

In some embodiments, first closure 302 and second closure 304 can intersect fuselage keel beam 122. Fuselage keel beam 122 can be the central beam of aircraft 100. Due to the weight of the forward and aft portions of aircraft 100, large bending moments can occur near the center of gravity (CG). Fuselage keel beam 122 can act as a "backbone" and load carrying frame of aircraft 100, can connect to wings 112, 114, provide connection between cockpit 104 and tail 106, and provide structural integrity of interior cabin 120 of aircraft 100. In some embodiments, fuselage keel beam 122 can be generally U-shaped. In some embodiments, fuselage keel beam 122 can be modified to account for the interruption of a single fuselage keel beam structure by first storage tank 202 and second storage tank 204, such that first storage tank 202 and second storage tank 204 are positioned about the center of gravity (CG). In some embodiments, fuselage keel beam 122 can be modified to account for width 306 of first storage tank 202 and width 308 of second storage tank 204, while maintaining structural integrity of aircraft 100, such that first storage tank 202 and second storage tank 204 are positioned about the center of gravity (CG). For example, the size and/or thickness of fuselage keel beam 122 can be increased in order to reduce its length. For example, fuselage keel beam 122 can be retrofitted to be positioned around a perimeter of first closure 302 and a perimeter of second closure 304. Fuselage keel beam 122 can be made from any suitable material, for example, but not limited to stainless steel, carbon steel, steel alloy, iron, titanium alloy, aluminum, or aluminum alloy. In some embodiments, fuselage keel beam 122 can have a high modulus of rigidity (G) and a high modulus of elasticity (E). For example, fuselage keel beam 122 can have a modulus of rigidity of 80 to 300 GPa and a modulus of elasticity of 100 to 400 GPa. In some embodiments, aircraft 100 can include a monocoque or thin-walled cylindrical fuselage that does not have a fuselage keel beam.

As shown, for example, in FIGS. 3 and 4, in some embodiments, first closure 302 and second closure 304 can be positioned about the center of gravity (CG) of aircraft 100. In some embodiments, a midpoint 314 of first closure 302 can be forward of the center of gravity (CG) and a midpoint 316 of second closure 304 can be aft of the center of gravity (CG). In some embodiments, midpoint 314 of first closure 302 and midpoint 316 of second closure 304 can be separated by a distance of 10 to 40 feet. In some embodiments, midpoint 314 of first closure 302 and midpoint 316 of second closure 304 can be separated by a distance of 15 to 20 feet. As shown in FIG. 4, for example, in some embodiments, distance 318 can represent the distance from midpoint 314 to the center of gravity (CG) and distance 320 can represent the distance from midpoint 316 to the center of gravity (CG). In some embodiments, the sum of distance 318 and distance 320 is 10 to 40 feet. In some embodiments, the sum of distance 318 and distance 320 is 15 to 20 feet. In some embodiments, a line connecting midpoint 314 of first closure 302 and midpoint 316 of second closure 304 is parallel to or disposed along longitudinal axis 126.

Figure 5:
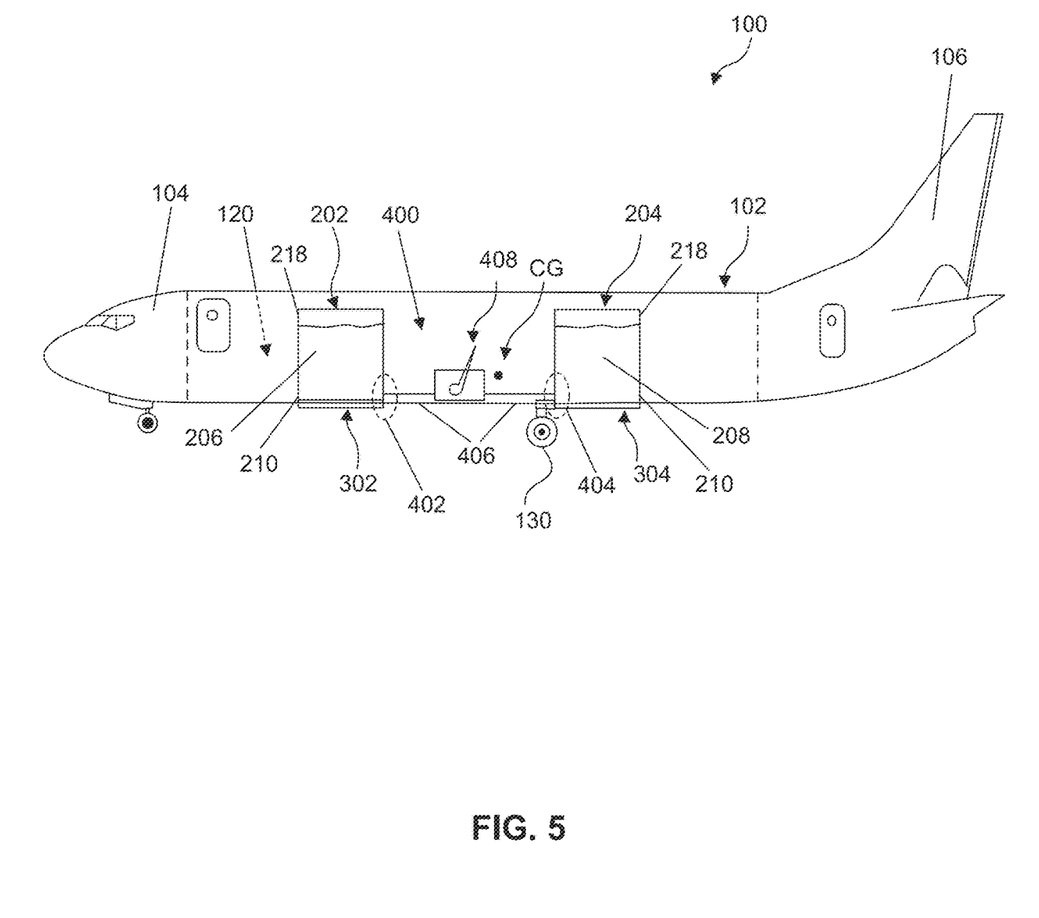
Figure 6:
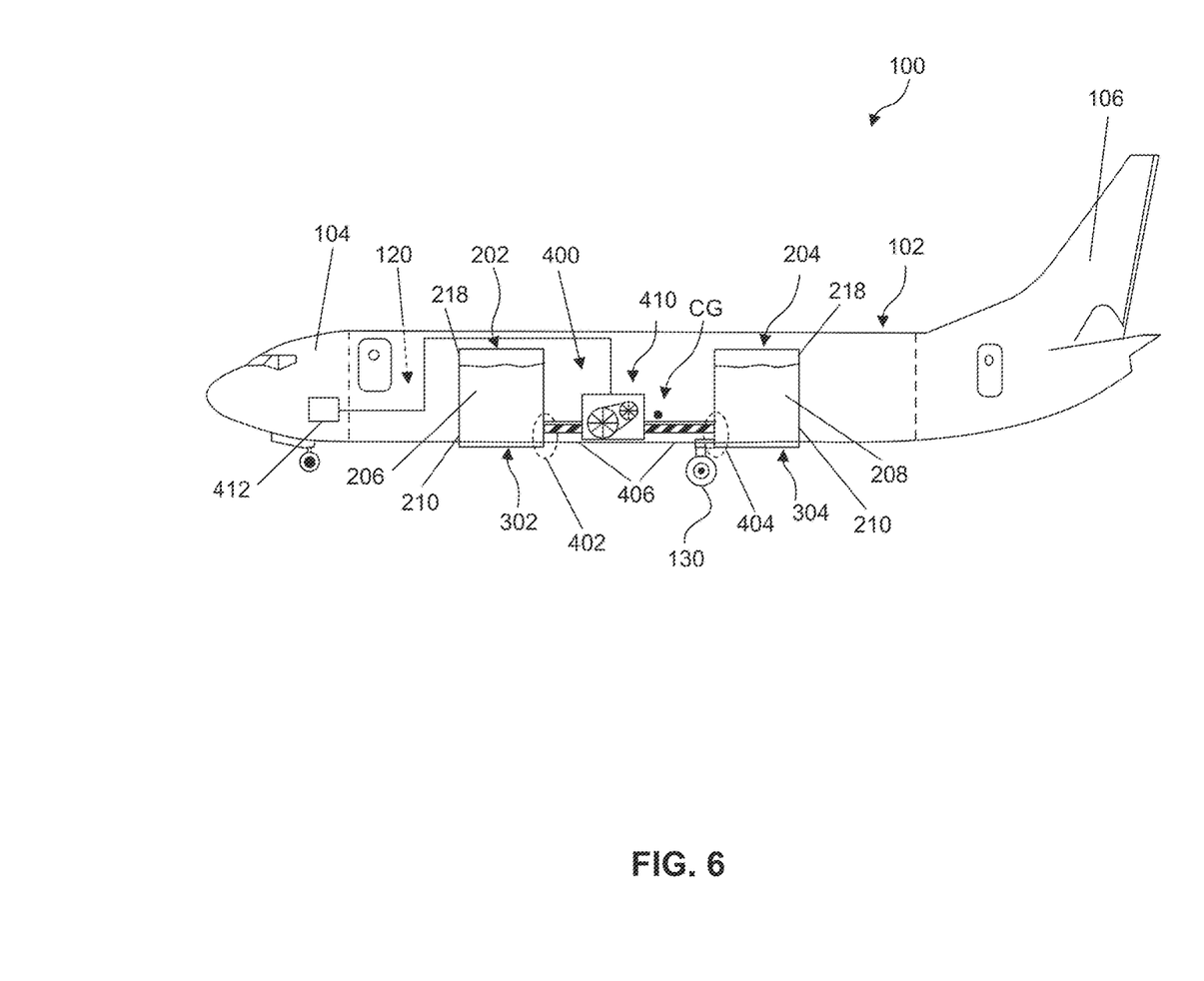

FIGS. 5 and 6 illustrate aircraft 100, according to embodiments. Aircraft 100 can include fuselage 102, cockpit 104, tail 106, first wing 112, second wing 114, interior cabin 120, landing gear 130, actuator 400, and a center of gravity (CG). In some embodiments, first storage tank 202 can include first closure 302 and second storage tank 204 can include second closure 304 disposed on the fuselage underside 128. In some embodiments, first closure 302 can be located at lower end 210 of first storage tank 202 and second closure 304 can be located at lower end 210 of second storage tank 204.

FIGS. 5 and 6 illustrate first material 206 and second material 208 disposed on first storage tank 202 and second storage tank 204, respectively. In some embodiments, first material 206 and/or second material 208 can be firefighting materials, for example, but not limited to water, fire retardant (e.g., brominated compounds, phosphorus compounds, nitrogen compounds, chlorinated compounds, inorganic compounds, hydrated aluminum, magnesium oxides, antimony trioxides, borates, etc.), or a mixture or combination thereof. In some embodiments, first material 206 can be water and second material 208 can be a fire retardant, or vice versa. In some embodiments, first material 206 and second material 208 can be the same. In some embodiments, first material 206 and second material 208 can be different. In some embodiments, first material 206 and second material 208 can be a mixture of water and fire retardant. In some embodiments, first material 206 and/or second material 208 can include about 9 lbs. of fire retardant per gallon of water. In some embodiments, first material 206 and second material 208 additionally can include a colored dye (e.g., red, blue, white, etc.) in the mixture for observers to clearly identify the ground drop pattern of materials 206, 208.

As shown, for example, in FIGS. 5 and 6, in some embodiments, an actuator 400 can be coupled to first storage tank 202 and/or second storage tank 204. For example, actuator 400 can be mechanical, electrical, hydraulic, pneumatic, or a combination thereof. In some embodiments, actuator 400 can be configured to operate (e.g., open and close) first closure 302 and/or second closure 304. FIG. 5 illustrates aircraft 100 with mechanical actuator 408 to operate first closure 302 and second closure 304, according to an embodiment, and FIG. 6 illustrates aircraft 100 with electrical actuator 410 and controller 412 to operate first closure 302 and second closure 304, according to an embodiment.

As shown in FIGS. 5 and 6, in some embodiments, actuator 400 can include first actuator 402, second actuator 404, and mechanical coupling 406 to first closure 302 and second closure 304. In some embodiments, actuator 400 can be configured to operate first closure 302 and second closure 304 synchronously. In some embodiments, actuator 400 can be configured to operate first closure 302 and second closure 304 at the same time. In some embodiments, actuator 400 can be configured to open first closure 302 and second closure 304 at the same rate. In some embodiments, actuator 400 can be configured to close first closure 302 and second closure 304 at the same rate. In some embodiments, actuator 400 can be configured to open first closure 302 and second closure 304 at different rates. In some embodiments, actuator 400 can be configured to close first closure 302 and second closure 304 at different rates. Synchronicity and constant operating rate of first closure 302 and second closure 304 by actuator 400 can provide a stable flow rate for dispersing materials, improve ground drop patterns, and maintain stability of aircraft 100 during a drop.

In some embodiments, first actuator 402 can be configured to operate first closure 302 and second actuator 404 can be configured to operate second closure 304. For example, in some embodiments, first and second actuators 402, 404 are mechanical (e.g., gears, rails, pulleys, chains, rack and pinion, shafts, hinges, springs, etc.). In some embodiments, mechanical coupling 406 (e.g., gears, rails, pulleys, chains, rack and pinion, shafts, hinges, springs, etc.) can be coupled to first actuator 402 and second actuator 404 to provide synchronous operation or activation of both actuators 402, 404. In some embodiments, a single actuator 400 can operate the first and second closures 302, 304.

In some embodiments, for example, as shown in FIG. 5, actuator 400 can be a mechanical actuator 408 (e.g., such as a lever, crank, pulley, etc.). In some embodiments, mechanical actuator 408 can be physically activated by an operator. In some embodiments, mechanical actuator 408 can activate mechanical coupling 406, which can operate first actuator 402 and second actuator 404. For example, mechanical actuator 408 can be operated to open first closure 302 and second closure 304. In some embodiments, mechanical actuator 408 can be operated to close first closure 302 and second closure 304. In some embodiments, mechanical actuator 408 upon activation by an operator can be configured to open first closure 302 and second closure 304 for a predetermined period of time and then close first and second closures 302, 304. For example, mechanical actuator 408 can include a built-in delay system (e.g., weights, pendulum, springs, etc.) that can automatically close first and second closures 302, 304 after a predetermined amount of time (e.g., 10 seconds, 30 seconds, 1 minute, or 2 minutes). In some embodiments, mechanical actuator 408 can be configured to operate first closure 302 and second closure 304 synchronously. In some embodiments, mechanical actuator 408 can be configured to open first closure 302 and second closure 304 at the same rate. In some embodiments, mechanical actuator 408 can be configured to close first closure 302 and second closure 304 at the same rate. In some embodiments, mechanical actuator 408 can be configured to operate first closure 302 and second closure 304 at the same time. In some embodiments, mechanical actuator 408 can be configured to open first closure 302 and second closure 304 at different rates. In some embodiments, mechanical actuator 408 can be configured to close first closure 302 and second closure 304 at different rates.

In some embodiments, for example, as shown in FIG. 6, actuator 400 can be an electrical actuator 410 (e.g., an electric motor, torque drive, etc.). In some embodiments, electrical actuator 410 can activate mechanical coupling 406, which operates first actuator 402 and second actuator 404. In some embodiments, electrical actuator 410 upon activation by an operator can be configured to open first closure 302 and second closure 304. In some embodiments, electrical actuator 410 upon activation by an operator can be configured to close first closure 302 and second closure 304. In some embodiments, electrical actuator 410 upon activation by an operator can be configured to open first closure 302 and second closure 304 for a predetermined period of time and then close first and second closures 302, 304. For example, electrical actuator 410 can include a delay circuit that can automatically close first and second closures 302, 304 after a predetermined amount of time (e.g., 10 seconds, 30 seconds, 1 minute, or 2 minutes). In some embodiments, electrical actuator 410 can be configured to operate first closure 302 and second closure 304 synchronously. In some embodiments, electrical actuator 410 can be configured to open first closure 302 and second closure 304 at the same rate. In some embodiments, electrical actuator 410 can be configured to close first closure 302 and second closure 304 at the same rate. In some embodiments, electrical actuator 410 can be configured to operate first closure 302 and second closure 304 at the same time. In some embodiments, electrical actuator 410 can be configured to open first closure 302 and second closure 304 at different rates. In some embodiments, electrical actuator 410 can be configured to close first closure 302 and second closure 304 at different rates.

In some embodiments, electrical actuator 410 can be activated by controller 412 (e.g., a switch, button, lever, dial, audio command, visual command, etc.). For example, controller 412 can be a switch electrically connected (e.g., via electric signal, analog signal, digital signal, etc.) to electrical actuator 410 that can activate electrical actuator 410. In some embodiments, controller 412 can be disposed in cockpit 104. In some embodiments, controller 412 can include an audio detector (e.g., MEMS microphone, piezoelectric microphone, etc.) that can detect an operator's audio command (e.g., speech, etc.). In some embodiments, controller 412 can include a photodetector (e.g., Si photodiode, etc.) that can detect an operator's visual command (e.g., waving hand, etc.)

In some embodiments, controller 412 upon activation by an operator can be configured to open first closure 302 and second closure 304 (e.g., by activating actuator 400). In some embodiments, controller 412 upon activation by an operator can be configured to close first closure 302 and second closure 304. In some embodiments, controller 412 upon activation by an operator can be configured to open first closure 302 and second closure 304 for a predetermined period of time and then close first and second closures 302, 304. In some embodiments, controller 412 can be configured to operate first closure 302 and second closure 304 synchronously. In some embodiments, controller 412 can be a computer system (e.g., in cockpit 104) that can automatically open first and second closures 302, 304 and after a predetermined amount of time (e.g., 10 seconds, 30 seconds, 1 minute, or 2 minutes) close first and second closures 302, 304. In some embodiments, controller 412 can be configured to operate first closure 302 and second closure 304 at the same time. In some embodiments, controller 412 can be configured to open first closure 302 and second closure 304 at different rates. In some embodiments, controller 412 can be configured to close first closure 302 and second closure 304 at different rates.

Figure 7:
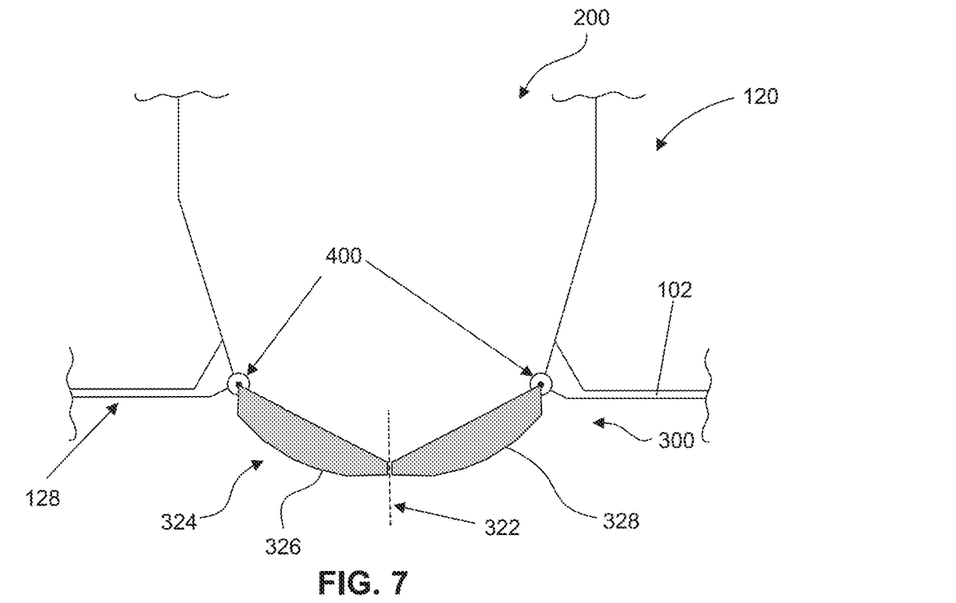
Figure 8:
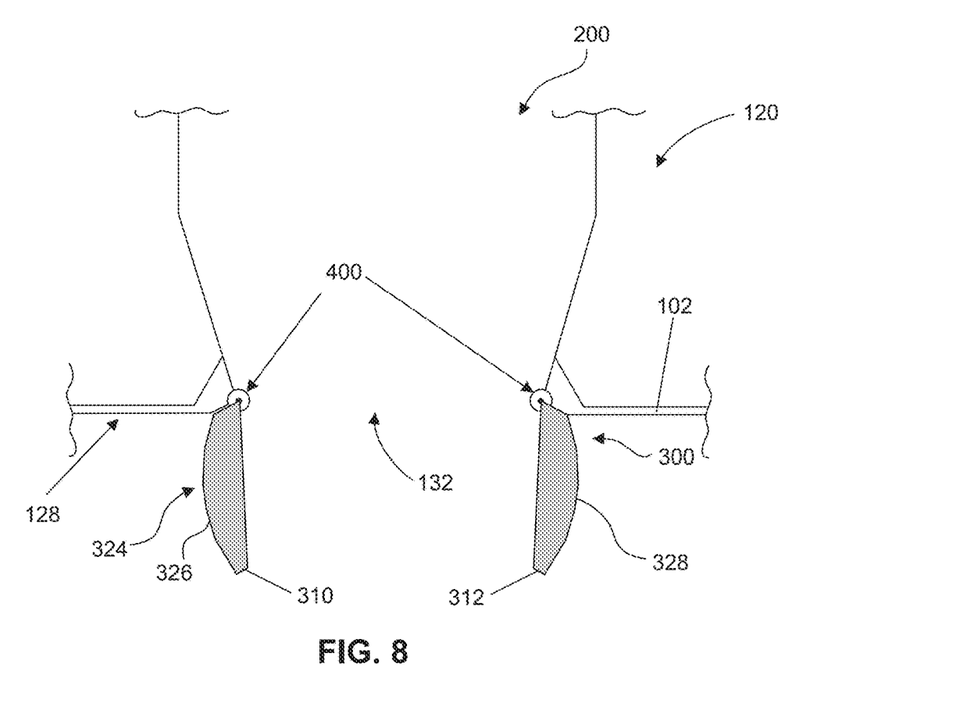

FIGS. 7 and 8 illustrate storage tank 200, closure 300, and actuator 400, according to embodiments. FIG. 7 illustrates a cross-sectional view of storage tank 200 with closure 300 in a closed position. FIG. 8 illustrates a cross-sectional view of opening 132 and storage tank 200 with closure 300 in an open position. In some embodiments, opening 132 can be, for example, one or more openings in fuselage underside 128. In some embodiments, opening 132 can be, for example, one or more openings in storage tank 200. In some embodiments, closure 300 can be coupled to storage tank 200. In some embodiments, closure 300 or an additional closure can be coupled to fuselage underside 128.

As discussed above, in some embodiments, storage tank 200 can be located in interior cabin 120 in fuselage 102 of aircraft 100 and closure 300 can be located at a lower end 210 of storage tank 200 and disposed on the fuselage underside 128. As shown in FIGS. 7 and 8, in some embodiments, closure 300 can include first closure portion 326 with a first edge 310 and second closure portion 328 with a second edge 312. In some embodiments, the closure 300 can be a "clamshell" door 324, as generally known in the aircraft industry. For example, clamshell door 324 can have two panels (e.g., first closure portion 326 and second closure portion 328) that can spread open on fuselage underside 128 of aircraft 100. In some embodiments, when clamshell door 324 is in a closed position, first edge 310 and second edge 312 can meet at a centerline 322 of clamshell door 324.

Actuator 400, discussed above, can be configured to operate closure 300. In some embodiments, actuator 400 can be configured to operate first closure portion 326 and second closure portion 328 synchronously. In some embodiments, actuator 400 can be configured to open first closure portion 326 and second closure portion 328 at the same rate. In some embodiments, actuator 400 can be configured to close first closure portion 326 and second closure portion 328 at the same rate. In some embodiments, actuator 400 can be configured to operate first closure portion 326 and second closure portion 328 at the same time. In some embodiments, actuator 400 can be configured to open first closure portion 326 and second closure portion 328 at different rates. In some embodiments, actuator 400 can be configured to close first closure portion 326 and second closure portion 328 at different rates.

In some embodiments, a method of dispersing material from aircraft 100 can include disposing first material 206 in first storage tank 202 and second material 208 in second storage tank 204, disposing first storage tank 202 and second storage tank 204 in interior cabin 120 of aircraft 100, and opening first closure 302 and second closure 304. In some embodiments, first storage tank 202 can be disposed forward of a center of gravity (CG) of aircraft 100 and second storage tank 204 can be disposed aft of the center of gravity (CG) of aircraft 100. In some embodiments, first closure 302 can be disposed at a lower end 210 of first storage tank 202 and second closure 304 can be disposed at a lower end 210 of second storage tank 204. In some embodiments, opening first closure 302 and second closure 304 can disperse first material 206 and second material 208 from aircraft 100. In some embodiments, first closure 302 and second closure 304 can be opened synchronously to disperse first material 206 and second material 208 from aircraft 100. In some embodiments, first closure 302 and second closure 304 can be closed synchronously. In some embodiments, first closure 302 and second closure 304 can be configured to open and close at the same rate. In some embodiments, first material 206 and second material 208 can be water, fire retardant, or a mixture or combination thereof. In some embodiments, first closure 302 and second closure 304 can be opened at the same time to disperse first material 206 and second material 208 from aircraft 100. In some embodiments, first closure 302 and second closure 304 can be opened at different times to disperse first material 206 and second material 208 from aircraft 100. In some embodiments, first closure 302 and second closure 304 can be configured to open and close at different rates.

In some embodiments, disposing first storage tank 202 and second storage tank 204 in interior cabin 120 of aircraft 100 can include disposing first storage tank 202 and second storage tank 204 such that a midpoint 314 of first closure 302 and a midpoint 316 of second closure 304 can be separated by a distance of 10 to 40 feet. In some embodiments, first closure 302 and second closure 304 can be disposed along longitudinal axis 126 of aircraft 100. In some embodiments, the method can include modifying a fuselage keel beam 122 such that first closure 302 and second closure 304 can intersect fuselage keel beam 122.

It is to be appreciated that the Detailed Description section, and not the Brief Summary and Abstract sections, is intended to be used to interpret the claims. The Summary and Abstract sections may set forth one or more but not all exemplary embodiments of the aerial firefighting suppression system and apparatus, and thus, are not intended to limit the present embodiments and the appended claims.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. An aircraft for dispersing firefighting material, comprising:

a fuselage defining an interior cabin of the aircraft;

a fuselage keel beam disposed within the fuselage;

a pair of wings coupled to the fuselage, wherein a first wing is disposed on a first side of the fuselage and a second wing is disposed on a second side of the fuselage;

a first storage tank disposed in the interior cabin forward of a center of gravity of the aircraft, wherein the first storage tank is configured to store a first firefighting material;

a second storage tank disposed in the interior cabin rearward of the center of gravity of the aircraft, wherein the second storage tank is configured to store a second firefighting material;

a first opening disposed in an underside of the fuselage, wherein the first storage tank is coupled to the first opening, and wherein the fuselage keel beam is positioned around a perimeter of the first opening for the first storage tank;

a second opening disposed in the underside of the fuselage, wherein the second storage tank is coupled to the second opening, wherein the fuselage keel beam is positioned around a perimeter of the second opening for the second storage tank, and wherein the first and second storage tanks have a total combined volume of at least 3,000 US gallons;

a first closure for the first opening;

a second closure for the second opening; and an actuator configured to open the first closure and the second closure to permit firefighting material disposed in the first and second storage tanks to exit the aircraft without introducing dynamic changes in the center of gravity of the aircraft.

2. The aircraft of claim 1, wherein the first opening is disposed forward of the center of gravity of the aircraft and the second opening is disposed rearward of the center of gravity of the aircraft.

3. The aircraft of claim 1, wherein the first storage tank is disposed forward of the pair of wings and the second storage tank is disposed rearward of the pair of wings.

4. The aircraft of claim 1, wherein the first storage tank is disposed above the first opening and the second storage tank is disposed above the second opening.

5. The aircraft of claim 1, wherein the actuator is configured to open the first closure and the second closure synchronously.

6. The aircraft of claim 5, wherein the actuator is configured to provide a stable flow rage for dispersing firefighting material so as to improve ground drop patterns and maintain stability of the aircraft during a drop.

7. The aircraft of claim 5, wherein the actuator is mechanical and mechanically coupled to the first closure and the second closure.

8. The aircraft of claim 5, wherein the actuator is electrical and mechanically coupled to the first closure and the second closure.

9. The aircraft of claim 1, wherein the first closure comprises a first door disposed at a lower end of the first storage tank and the second closure comprises a second door disposed at a lower end of the second storage tank.

10. The aircraft of claim 9, wherein the first door is coupled to the lower end of the first storage tank and disposed in the first opening, and wherein the second door is coupled to the lower end of the second storage tank and disposed in the second opening.

11. The aircraft of claim 1, wherein the first storage tank and the second storage tank have the same volume.

12. The aircraft of claim 1, wherein the first storage tank is configured to store a first volume of at least 3,000 US gallons and the second storage tank is configured to store a second volume of at least 3,000 US gallons.

13. The aircraft of claim 1, wherein a midpoint of the first opening and a midpoint of the second opening are separated by a distance of 10 to 40 feet.

14. The aircraft of claim 1, wherein the pair of wings is disposed below a midline of the fuselage.

15. The aircraft of claim 1, wherein the first storage tank is disposed entirely forward of the center of gravity of the aircraft.

16. A system for dispersing firefighting material from an aircraft, comprising:
   a fuselage;
   a fuselage keel beam disposed within the fuselage
   a first storage tank disposed in the fuselage forward of a center of gravity of the aircraft;
   a second storage tank disposed in the fuselage rearward of the center of gravity of the aircraft;
   a first opening disposed at a lower end of the first storage tank, wherein the fuselage keel beam is positioned around a perimeter of the first opening for the first storage tank;
   a second opening disposed at a lower end of the second storage tank, wherein the fuselage keel beam is positioned around a perimeter of the second opening for the second storage tank, and wherein the first and second storage tanks have a total combined volume of at least 3,000 US gallons;
   a first closure disposed at the lower end of the first storage tank for the first opening;
   a second closure disposed at the lower end of the second storage tank for the second opening; and
   an actuator configured to open the first closure of the first opening and the second closure of the second opening to permit firefighting material disposed in the first and second storage tanks to exit the aircraft without introducing dynamic changes in the center of gravity of the aircraft.

17. The system of claim 16, wherein the actuator is configured to open the first closure and the second closure synchronously.

18. The system of claim 16, wherein the first closure comprises a first door and the second closure comprises a second door, and wherein the actuator is mechanically coupled to the first door and the second door.

19. The aircraft of claim 16, wherein the first storage tank is disposed entirely forward of the center of gravity of the aircraft.

20. A high lift capacity airplane for dispersing firefighting material, comprising:
   a fuselage defining an interior cabin of the high lift capacity airplane;
   a fuselage keel beam disposed within the fuselage;
   a pair of wings coupled to the fuselage, wherein a first wing is disposed on a first side of the fuselage and a second wing is disposed on a second side of the fuselage opposite the first wing;
   a first storage tank having a total volume of at least 1,500 gallons disposed in the interior cabin forward of a center of gravity of the high lift capacity airplane, wherein the first storage tank is configured to store a first volume of firefighting material;
   a second storage tank having a total volume of at least 1,500 gallons disposed in the interior cabin rearward of the center of gravity of the high lift capacity airplane, wherein the second storage tank is configured to store a second volume of firefighting material;
   a first opening in an underside of the fuselage disposed directly beneath the first storage tank and coupled to the first storage tank to allow the first volume of firefighting material stored in the first storage tank to disperse from the high lift capacity airplane;
   a second opening in the underside of the fuselage disposed directly beneath the second storage tank and coupled to the second storage tank to allow the second firefighting material stored in the second storage tank to disperse from the high lift capacity airplane;
   wherein the fuselage keel beam is positioned around a perimeter of the first opening for the first storage tank and around a perimeter of the second opening for the second storage tank;
   a first door covering the first opening coupled to the first storage tank for allowing the first volume of firefighting material stored in the first storage tank to disperse from the high lift capacity airplane when the first door is in an open position; and
   a second door covering the second opening coupled to the second storage tank for allowing the second volume of firefighting material stored in the second storage tank to disperse from the high lift capacity airplane when the second door is an open position,
   wherein positioning the first and second storage tanks about the center of gravity of the high lift capacity airplane evenly distributes the first and second volumes of firefighting material to reduce dynamic changes in the center of gravity upon dispersing the first and second volumes of firefighting material.

21. The high lift capacity airplane of claim 20, wherein the first storage tank is disposed entirely forward of the center of gravity of the high lift capacity airplane and the second storage tank is disposed entirely rearward of the center of gravity of the high lift capacity airplane.

22. The high lift capacity airplane of claim 20, wherein the first door and the second door each comprise a first panel having a first edge and a second panel having a second edge, wherein the first edge and the second edge meet at a centerline in a closed position of the respective door.

23. The high lift capacity airplane of claim 20, wherein the first and second storage tanks are spaced apart from each other, such that a midpoint of the first opening and a midpoint of the second opening are separated by at least 10 feet.

* * * * *

UNITED STATES PATENT AND TRADEMARK OFFICE
CERTIFICATE OF CORRECTION

PATENT NO.         : 10,273,003 B2
APPLICATION NO.    : 15/487945
DATED              : April 30, 2019
INVENTOR(S)        : Coulson et al.

Page 1 of 1

It is certified that error appears in the above-identified patent and that said Letters Patent is hereby corrected as shown below:

In the Claims

Column 14, Line 62, Claim 6, "rage" should be --rate--.

Column 15, Line 30, Claim 16, "the fuselage" should be --the fuselage;--.

Column 15, Line 63, Claim 19, "aircraft" should be --system--.

Column 16, Line 10, Claim 20, "1,500" should be --1,500 US--.

Column 16, Line 15, Claim 20, "1,500" should be --1,500 US--.

Signed and Sealed this
Twenty-fifth Day of June, 2019

Andrei Iancu
*Director of the United States Patent and Trademark Office*